Jan. 5, 1965     L. D. BARRY     3,164,406
AUTOMATIC HOLDING DEVICE

Filed Sept. 7, 1960               9 Sheets-Sheet 1

INVENTOR.
Leonard D. Barry

INVENTOR.
Leonard D. Barry

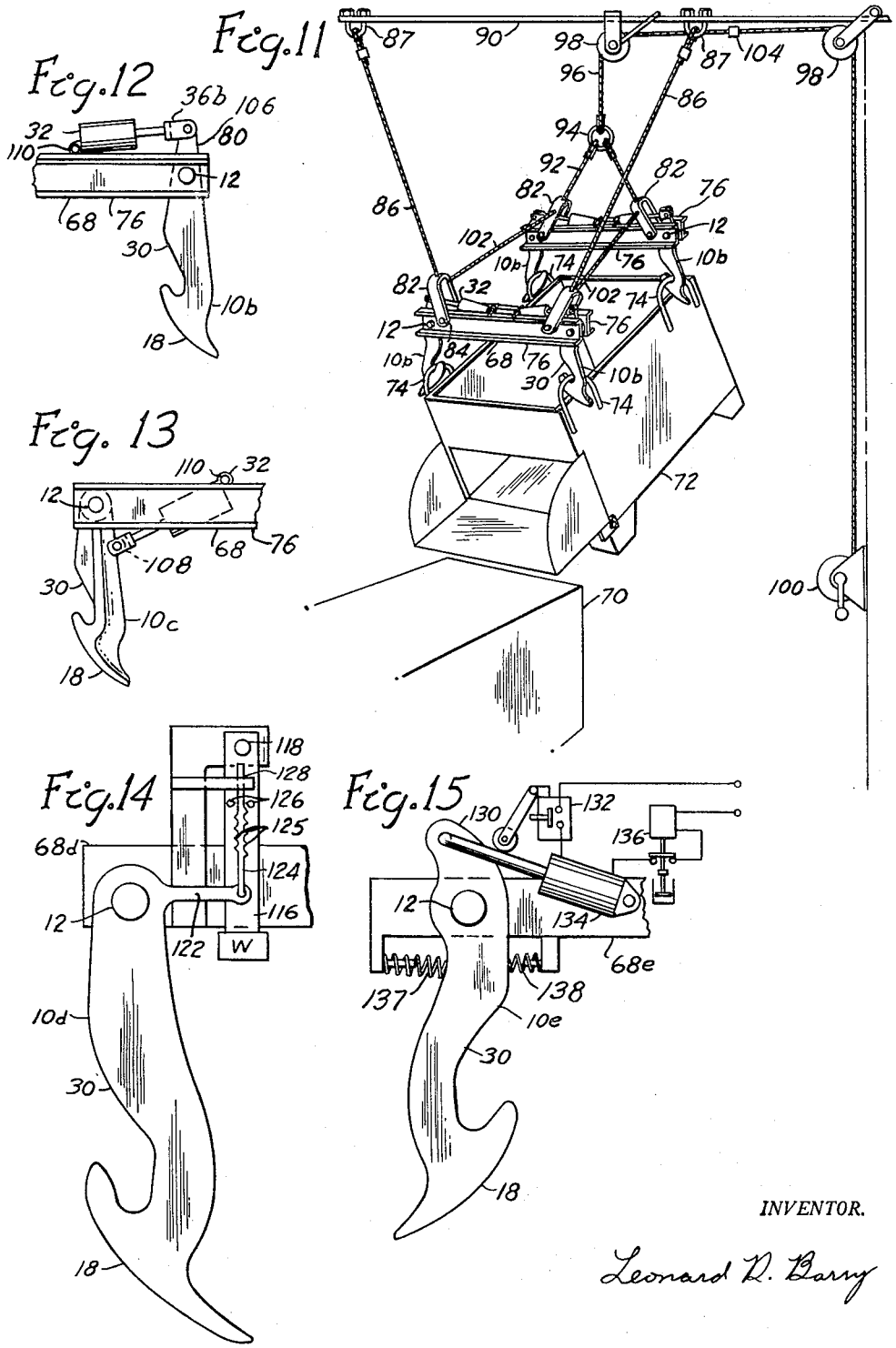

Jan. 5, 1965 L. D. BARRY 3,164,406
AUTOMATIC HOLDING DEVICE
Filed Sept. 7, 1960 9 Sheets-Sheet 4

INVENTOR.
Leonard R. Barry

Jan. 5, 1965
L. D. BARRY
3,164,406
AUTOMATIC HOLDING DEVICE
Filed Sept. 7, 1960
9 Sheets-Sheet 5
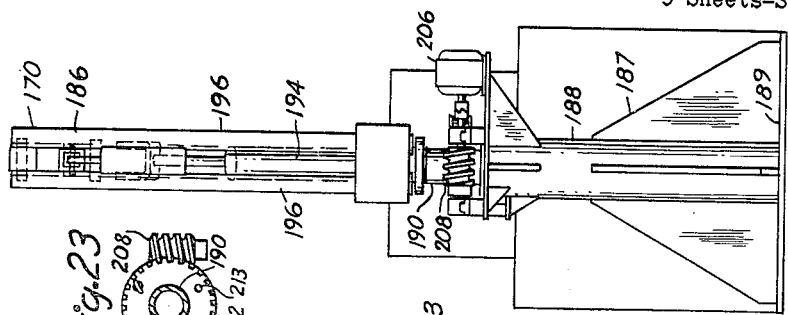
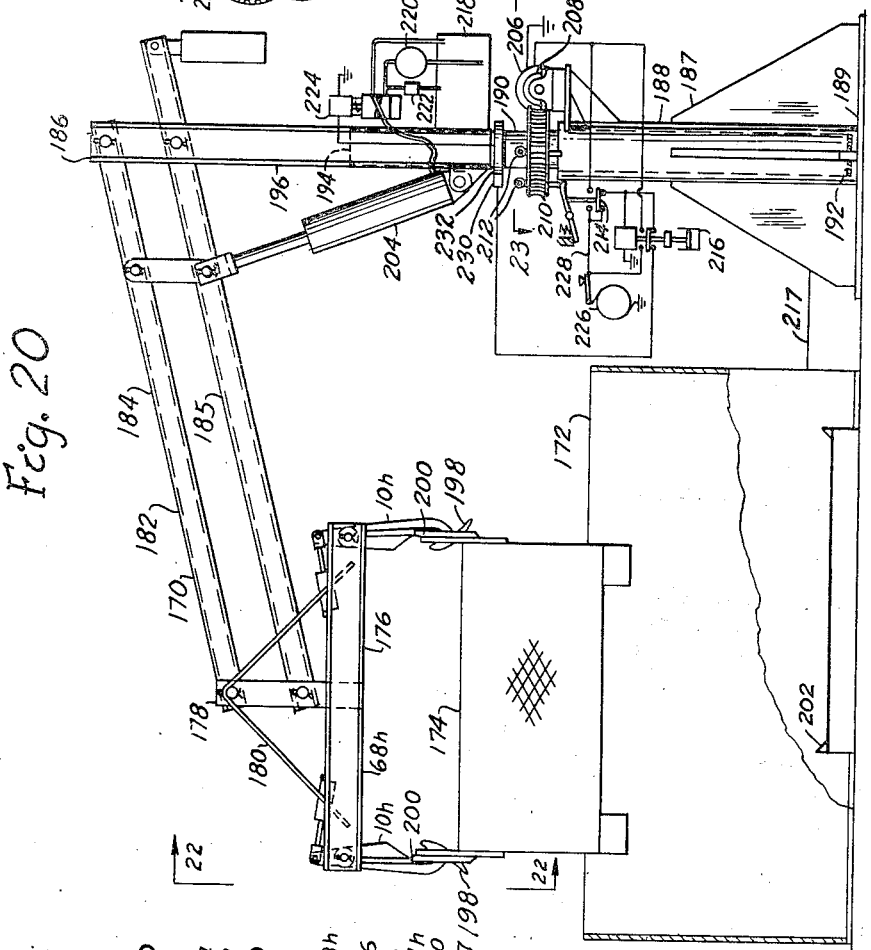
INVENTOR.
Leonard D. Barry INVENTOR.
Leonard D. Barry Jan. 5, 1965 　　　L. D. BARRY 　　　3,164,406
AUTOMATIC HOLDING DEVICE
Filed Sept. 7, 1960 　　　9 Sheets-Sheet 7
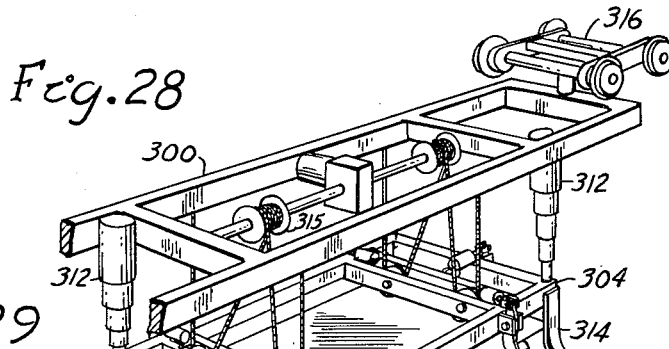
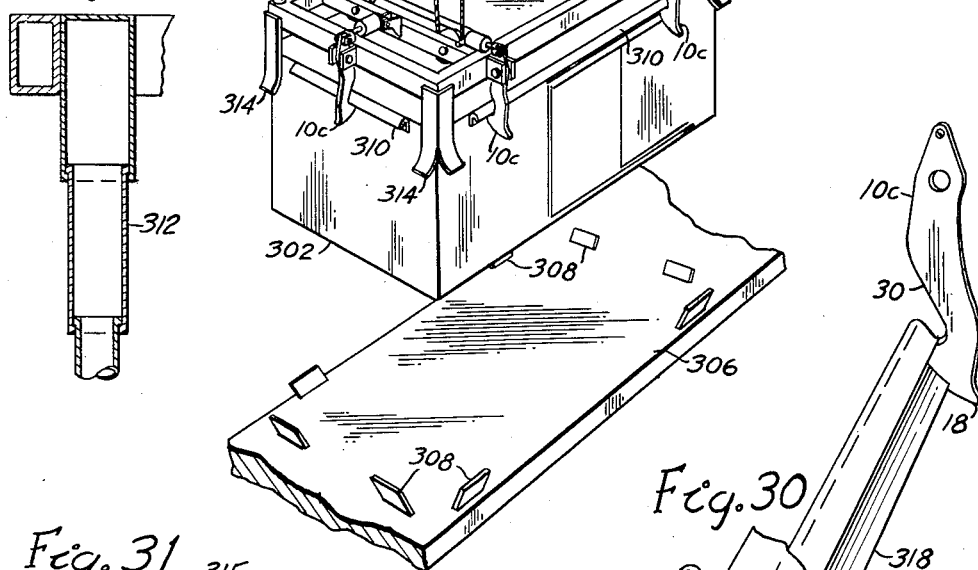
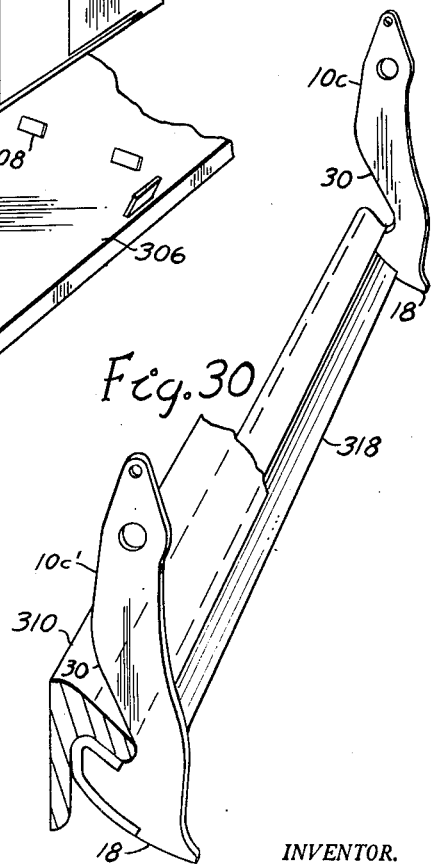
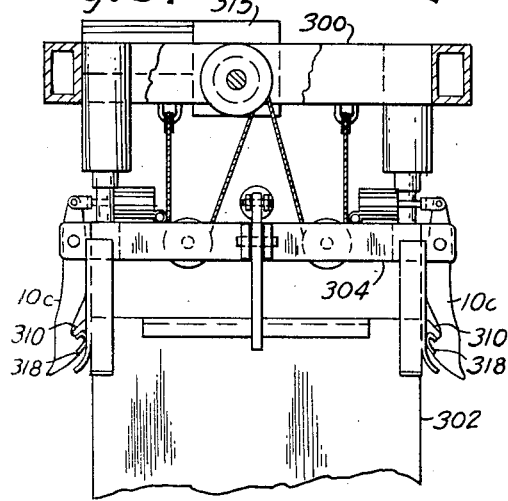
INVENTOR.
Leonard D. Barry Jan. 5, 1965
L. D. BARRY
3,164,406
AUTOMATIC HOLDING DEVICE
Filed Sept. 7, 1960
9 Sheets-Sheet 8
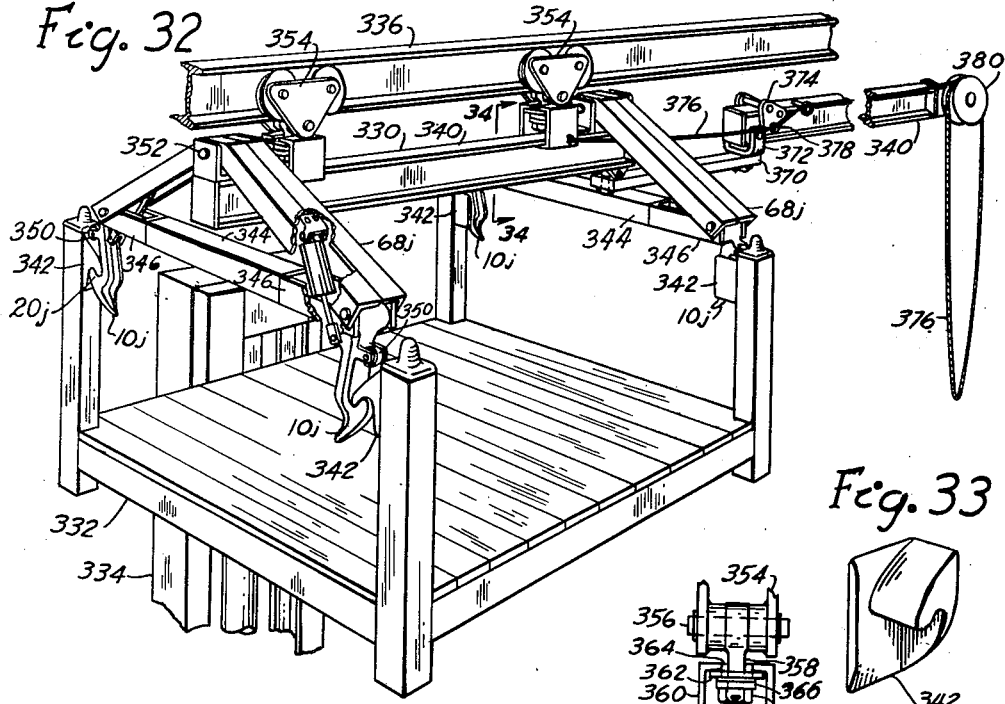
Fig. 32
Fig. 33
Fig. 34
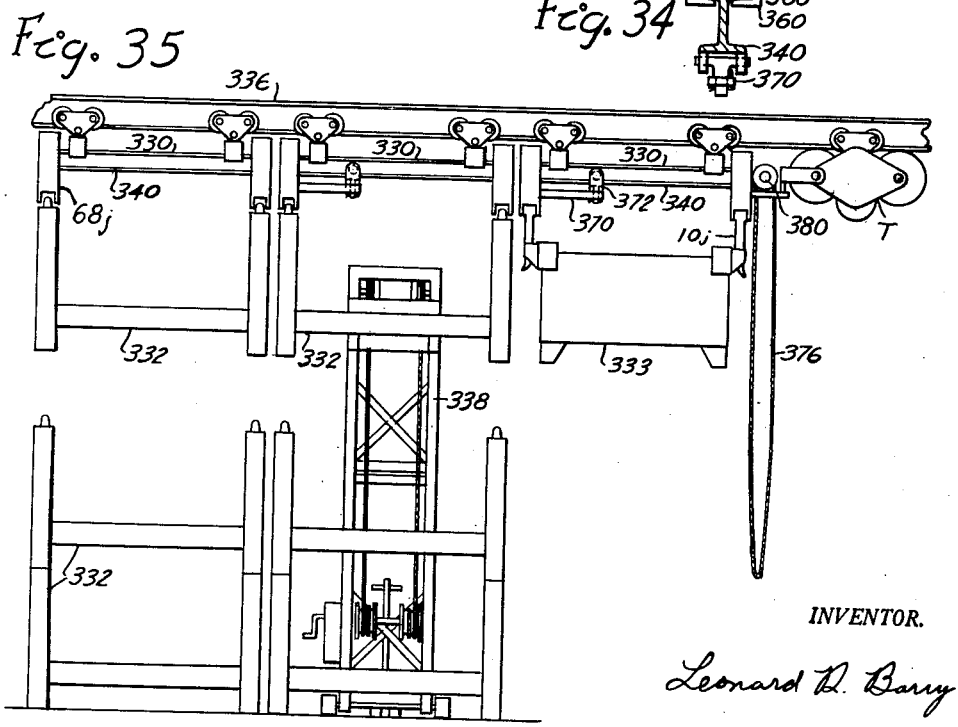
Fig. 35
INVENTOR.
Leonard D. Barry Jan. 5, 1965 L. D. BARRY 3,164,406
AUTOMATIC HOLDING DEVICE
Filed Sept. 7, 1960 9 Sheets-Sheet 9
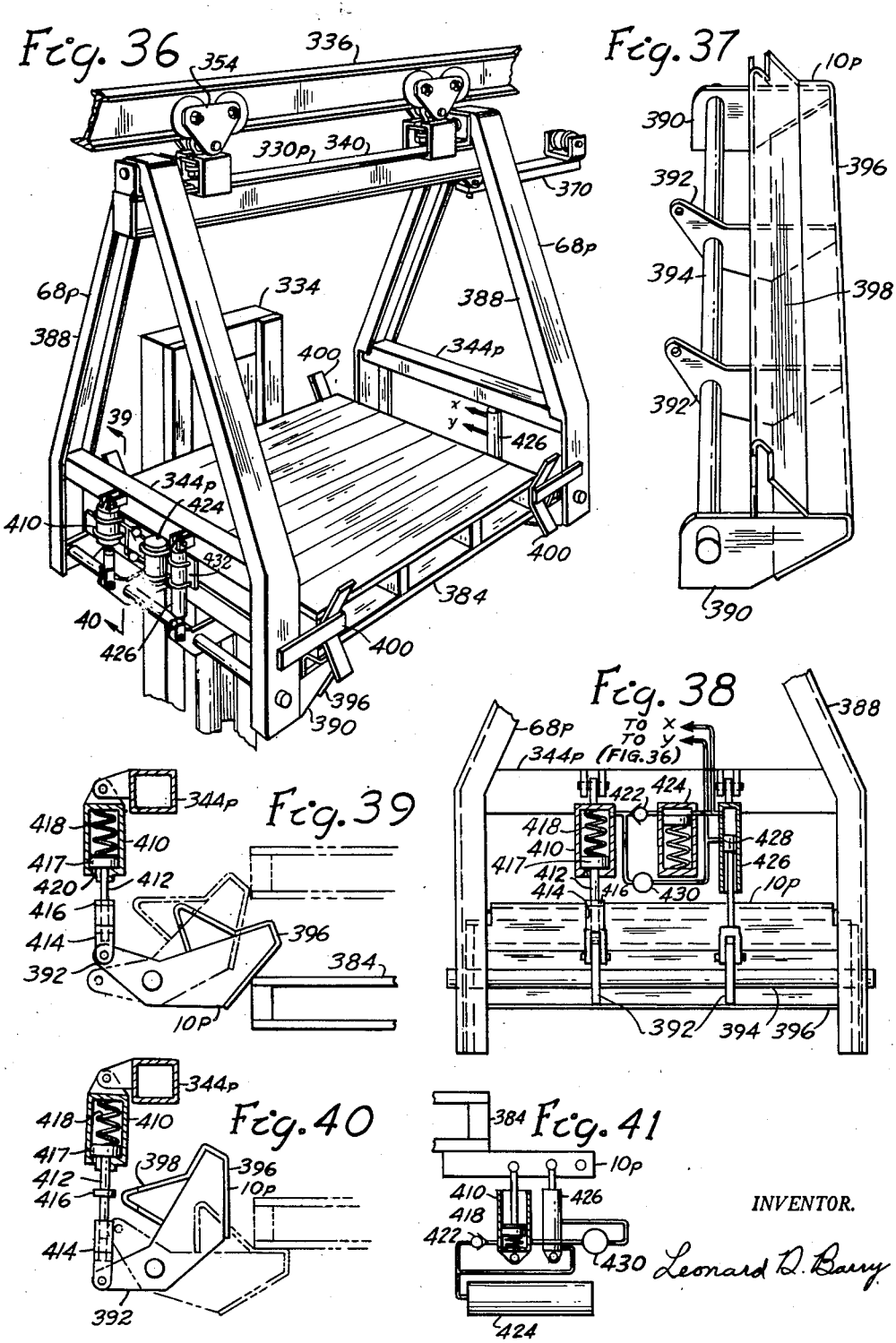
INVENTOR.
Leonard D. Barry though United States Patent Office 3,164,406
Patented Jan. 5, 1965

3,164,406
AUTOMATIC HOLDING DEVICE
Leonard D. Barry, 19300 Pennington Drive,
Detroit 21, Mich.
Filed Sept. 7, 1960, Ser. No. 54,541
10 Claims. (Cl. 294—88)

This invention relates to material handling apparatus and in particular to a novel holding and suspending system for self engaging and disengaging of the load.

This is a continuation in part of my pending patent application Ser. No. 17,658, filed March 25, 1960, titled Material Handling System, and relates to simplification of the hook and hook return means and extends the application of the holding means. In this earlier application the hook had a "protrusion" for opening it, which was always shown as a roller. The roller requires a sloped surface or cam to open it, and the cam was the lower hook and was on the container. It is an object to provide a cam on the upper hook or holding device which can be actuated by any solid object which can engage it and to reduce the lower hook to a hole or loop handle where desired or to eliminate the lower hook where not desirable or available, thus extending the application of the holding device. It is another object to simplify the dashpot by using a piston which functions as a check valve and by simplifying the venting of the cylinder. It is an object to broaden the disclosure regarding alternatives.

It is an object to provide a simple and inexpensive automatic holding and release device which is actuated by vertical movement relative to the object to be held. The device engages when let down vertically on an object or when the object is lifted to engage, and latches, clamps, or hooks to lift or hold the object. The device releases when the object is set down or raised above engaging position of the device and causes the holding device to swing open for a time to allow the holding device and the object to be separated by vertical movement. It is an object to apply such actions and means to hooks, tongs, clamps, and latches for supporting objects from cranes or hoists, suspending and tilting parts boxes lifted by a fork truck, for dip tank derricks, for truck mounted container derricks, for handling transfer containers, material, or work, for suspending containers or pallets on monorail, and for fork truck or automatic loading and unloading of containers or pallets from overhead suspending or carrying devices and for many other applications.

My holding device has guides or cams which complete alignment of the device with the load to be lifted and open the device for clutching the load. It has means for supporting the object by latching under or into or clamping on the load or by a combination of latching and clamping. It has means for opening wide when the load is supported at a higher elevation relative to the holding device than for engaging, and means for holding the device open for removal of the load and for thereafter returning the device to engaging condition.

There are many applications and situations where automatic holding means can save considerable time and effort in picking up and setting down transfer containers, parts boxes or baskets, racks, trays, pallets, structural members, plate, work in progress, parts, or goods.

It is an object to provide balanced operation by using opposed hooks, tongs or latches for holding from opposite sides of the load, so that when the holding devices are supported on the end of a crane or hoist cable they spread on the load between them and hook or unhook without requiring horizontal motion of the crane or hoist for hooking. This eliminates the motions which cause the hook block to swing and the tedious alignment problem where a crane operator tries to hook a load. This balanced relation prevents the cable supported hooks from deflecting away from the load to be hooked when let down thereon. It is an object to provide holding means with wide engagement tolerance which will guide itself into holding position.

Other objects are directed to safety, convenience, dependability of operation, and economy in the construction of the holding means, its supports, and controls, and of the containers for operation therewith.

Still other and further objects will be pointed out hereinafter or should be apparent from consideration of this invention as described with reference to the accompanying drawings wherein:

FIGURE 11 is a perspective view of a drop side box on a box tilt suspension utilizing a variation of the hook.

FIGURE 12 is a side view of an end of a hook yoke with the hook facing in as in FIGURE 11.

FIGURE 13 is a side view of an end of a hook yoke with the hook facing out.

FIGURE 14 is a side view of a variation of the hook with a mechanical timer replacing the dashpot.

FIGURE 15 is a side view of a variation of the hook with an actuator, control, and timer replacing the dashpot.

FIGURE 20 is a side elevation (partly schematic) of a dip tank, basket, and derrick with controls for the derrick to pick up, dip, and set down the basket.

FIGURE 21 is an end elevation of the derrick of FIGURE 20.

FIGURE 22 is a view taken on line 22—22 of FIGURE 20.

FIGURE 23 is a partial section on line 23—23 of FIGURE 20 to show the pin holes in the worm gear.

FIGURE 28 is a perspective view of a shipping container transfer device transferring a container to or from a platform.

FIGURE 29 is a sectional view of telescoping guides for the transfer device of FIGURE 28.

FIGURE 30 is a perspective view of a hook runner engaging a section of the hook molding on the container of FIGURE 28.

FIGURE 31 is an end sectional elevation of the transfer device and container of FIGURE 28.

FIGURE 32 is a perspective view of a rack, parts box or truck carrier and the sill of the adjoining carrier, the coupling between the carriers, and a fork truck partly shown about to release a rack from the carrier.

FIGURE 33 is a perspective view of a container hook.

FIGURE 34 is a section taken on line 34—34 of FIGURE 32.

FIGURE 35 is a side elevation of a monorail with a train of the carriers of FIGURE 32 bunched over a storage area of stacked containers and a portable stacker for loading and unloading and stacking the containers from the train.

FIGURE 36 is a perspective view of a monorail pallet carrier, which can be operated in the train of FIGURE 35 with a pallet engaged thereon and the fork truck which engaged it partly shown.

FIGURE 37 is a perspective view of the hook on the carrier of FIGURE 36.

FIGURE 38 is an end view of the lower portion of the carrier of FIGURE 36 with the controls shown partly schematically.

FIGURES 39 and 40 are sections taken on lines 39—40 of FIGURE 36 showing the operation of the hook.

FIGURE 41 is a schematic of hook controls for a pallet carrier the lever being rearranged.

In the drawings like parts are given the same reference numbers, and a suffix letter is added to indicate a variation of that part.

Hooks

Figure 1:
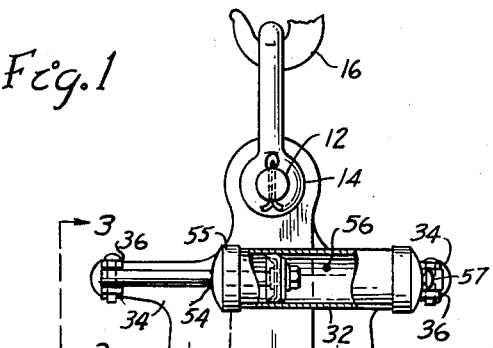
FIGURES 1 and 2 are respectively front and right side views of one form of my automatic hooks controlled by a dashpot with a portion of the dashpot wall removed to show the piston.

Referring to the drawings and in particular to FIGURES 1–6, two hooks 10 (sister hooks) preferably similar and cut from steel plate or forged have a hole on which they are swivelly mounted facing each other on pin 12 of shackle 14 which can be hooked over a crane or hoist hook 16 for automatically engaging and disengaging several types of objects.

Figure 2:
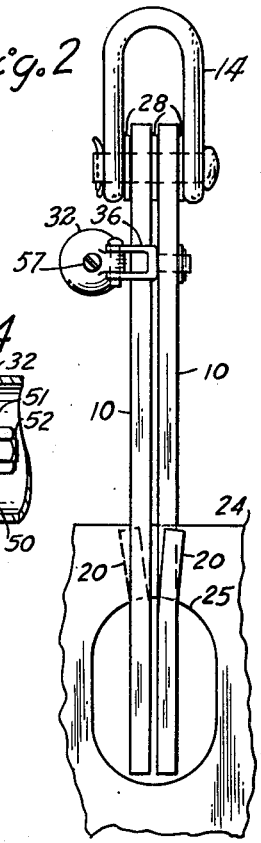
Figure 3:
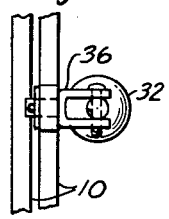
FIGURE 3 is a partial left side view between the arrows 3—3 of FIGURE 1.

Each hook 10 has a lower cam 18 which sweeps back and down from the tooth 20 to a point back of saddle 22 and preferably to a point beyond the body of the hook to swing the hook back when engaged with the top of an object to be lifted. The hook when lowered on an object protruding between points p—p forces the hook open to latch the hook under the piece to be lifted, which can be the side of a parts box or flat 24 with a hole 25 in it as shown in FIGURE 2, a rod loop 26 on tray 27 shown in FIGURE 6, a chain or rope stretched or draped across an opening, or anything which can be engaged and hooked over the hook. A washer 28 preferably separates plates 10, and the teeth of these hooks are bent away from each other if need be, so that they can pass over each other without bumping as shown in FIGURES 1 and 2.

Each hook 10 has an upper cam 30 for engaging the object held between the hooks when the hooks are lowered and sets the load down. The upper cams swing the hooks wide open under the weight of the hooks to the position shown by solid lines in FIGURE 5, which is beyond maximum latching position represented by phantom lines in this figure.

A closing delay device then delays the action of gravity in closing the hooks to enable the hooks to be lifted off the object while open. The delay is preferably a dashpot 32 swivelly connected between the hook plates on lever arms or fingers 34 extending from the face of hook 10 on the hook side of pivot 12 above the upper cam as part of the plate. The head and rod ends of dashpot 32 are each pinned between the forks of a yoke 36 to pivot thereon to prevent damage or binding of the dashpot as the plates spread or meet under variation of load. The stems of yokes 36 are swivelly secured each in a hole in the end of a finger 34 to pivot the dashpot as the hooks open and close. The mounting of each end of the dashpot is therefore a universal joint.

Figure 4:
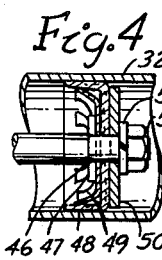
FIGURE 4 is a sectional view of the dashpot piston in a portion of its cylinder drawn to a larger scale than FIGURE 1.

The piston of dashpot 32, shown in FIGURE 4, has the same components as in a door closer, a shoulder 46, a flat washer 47, a cupped washer 48 of leather or other flexible material having a low coefficient of friction on the wall of cylinder 32, a spring 49 (optional) for expanding the cupped washer against the wall of cylinder 32, a flat washer 50 for supporting the leather washer, a lock washer 51 and nut 52 all on the end of the rod of the dashpot; but the flat washers, cupped washer, and spring are placed on the rod in the reverse order, and the cupped washer and spring are reversed from the arrangement in a door closer. The door closer spring is omitted from the cylinder, but a compression spring can be placed ahead of the piston to aid the force of gravity in returning the hook. Air passes freely through the rod guide hole 54 in cap 55, FIGURE 1, and through hole 56 in the cylinder. A bleed screw 57 adjusts the vacuum drawn in the head end of the cylinder.

Figure 5:
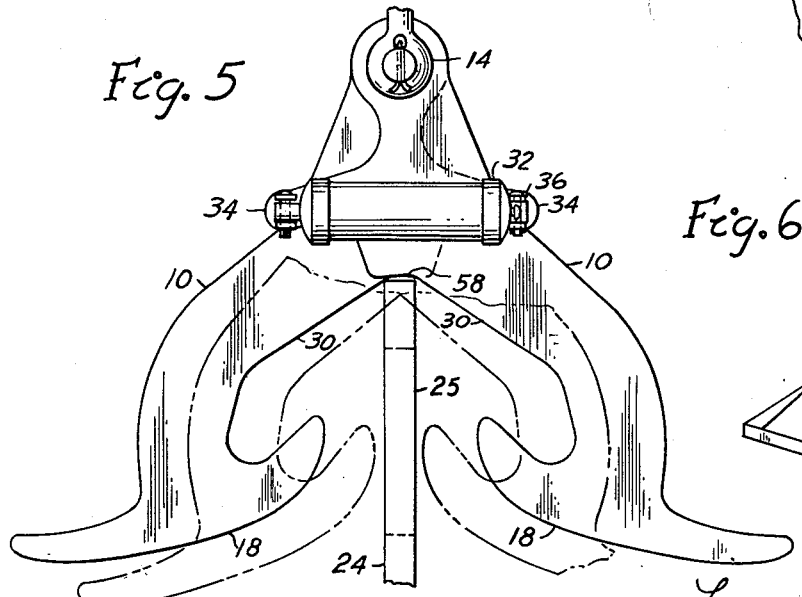
FIGURE 5 is a front view of the hooks in full open position with maximum latching position shown in phantom.
Figure 6:
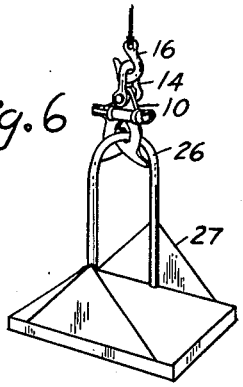
FIGURE 6 is a perspective view of the hook suspended from a hoist and engaged with the handle of a material handling tray.

In operation the hooks 10 are lowered over the hook loop and spread by the lower cams forcing the piston of the dashpot in, passing air through hole 56. The hooks swing by gravity to latch under the object without appreciable delay from the dashpot, for these reasons: the piston was not pushed in far enough to pass hole 56; holes 54 and 56 pass air freely; and the friction of the leather washer in the cylinder is kept low with lubricant such as light oil which also helps to seal the piston to the cylinder. To release the hooks the object held is set down. The top of the object wedges between cams 30 opening the hooks under the weight of the hooks until the hooks rest on stops 58, as shown in FIGURE 5. Stops 58 prevent the hooks from being wedged open farther than desired and take the force if the hooks are mounted so as to be forced down on the load.

The hooks can be yoke mounted for engaging opposite ends of bars or pipe, a plurality of handles or trunnions on a container, or for simultaneously engaging a plurality of containers. If the hook is supported on its arms 34 it becomes a clamp or tongs.

Tongs

Figure 7:
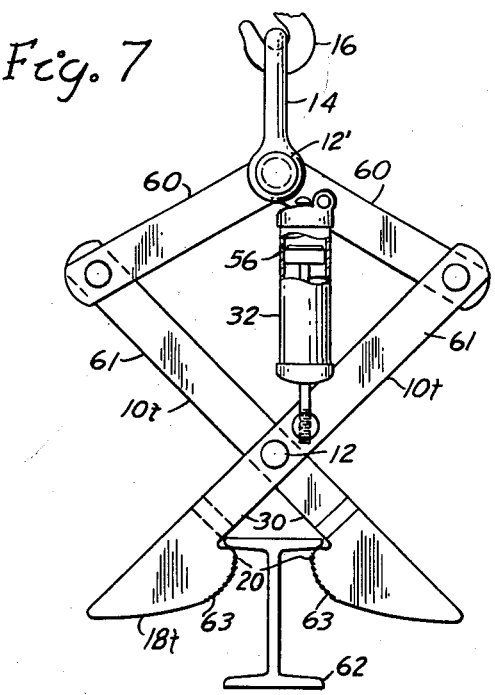
FIGURES 7 and 8 are respectively front and right side views of my automatic tongs for use on a crane or hoist and showing a portion of the dashpot wall removed to show the piston.
Figure 8:
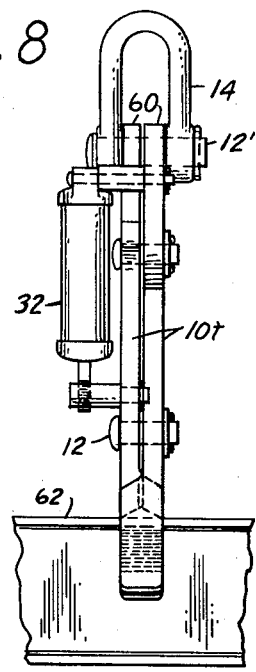

Referring to FIGURES 7 and 8 for an example of improved hoist tongs or grabs having my automatic opening feature, tongs 10t are pivotally secured together at 12 and actuated by two links 60 connected one to the top of each actuating arm 61 of the tongs and both conected on pin 12' of clevis 14 for hooking on the crane or hoist hook 16 between the tongs. Tongs 10t also preferably have teeth 20 for engaging under rods or in holes and are suited for engaging under the upper flange of I-beam 62 as shown. Cam 18t sweeps down and back from each tooth 20 to latch over the I-beam or other load and has up-pointing serrations 63 to grip with. Dashpot 32 is pivotally secured between a bar 60 and a tong so as to be compressed in when the tongs are opened by lowering the tongs after the load is set down. The tongs latch the I-beam without the delay action of dashpot 32, since they must open further than shown in FIGURE 7 before the piston of dashpot 32 passes hole 56 to delay the closing of the tongs. The tongs open wide to release an object held when the weight of the tongs wedges the object between cams 30 as links 60 force down on the upper tong levers.

Figure 9:
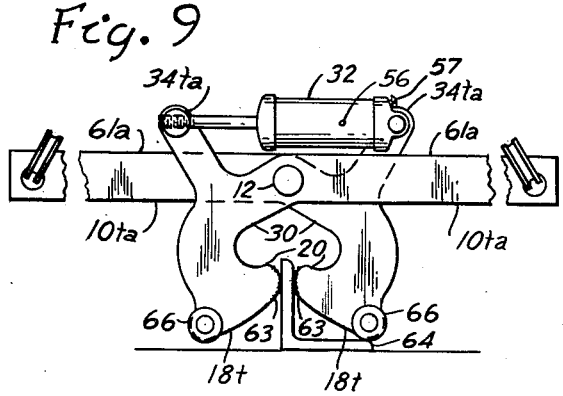
FIGURES 9 and 10 are respectively front and right side views of a variation of my tongs.
Figure 10:
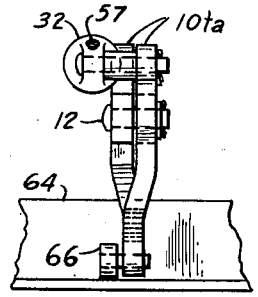

Referring to FIGURES 9 and 10 for a variation of my tongs especially suited for engaging a short upstanding edge such as the leg of angle 64, tongs 10ta, pivoted at 12, each have an arm 34ta extending up above pivot 12 from the tooth side of the pivot and an actuating arm 61a extending from pivot 12 out the opposite side. Dashpot 32 is pivotally secured between arms 34ta to delay the closing of the tongs when opened by the weight of arms 61a when the load, angle 64, is set down. If the tongs are opened much beyond the position shown the piston of dashpot 32 passes hole 56 and the tongs are held open when lifted and close at a speed set by screw 57. Hole 56 can be omitted where the objects to be gripped are all upstanding plates or legs, since the tongues in such use do not latch under the object held, but it is preferred to include hole 56 for engaging I-beams as in FIGURE 7. Hole 56 can be slotted to cap 55 and the outside of the tube covered over the slot to protect from dirt entering. The engaging portion of each tong (teeth 20ta) are bent in to engage in the same plane. The front of each tooth again has grip teeth 63. The tong is suspended through a hole in the end of each lever arm 61a by rods, rope, or chain to a hook or yoke (not shown). The tongs can be yoke mounted for engaging opposite ends of a structural member, pipe, or plate. A roller 66 on the bottom of each lower cam 18, FIGURE 9, aids in opening the hooks or tongs when engaged on a flat surface in setting down an object.

Yoke Mounting

If the hooks are spaced apart on a yoke and pivotally secured to swing in the same plane as shown in FIGURE 11, only one hook on each end of the yoke is needed for many applications such as for engaging and releasing baskets, parts boxes, racks, steel barrels, and many other items including auto frames and other parts. The hook yoke can be mounted on a monorail, elevator, or other conveying, hoisting or holding device.

Tilt Suspension for Parts Box

Referring to FIGURES 11 and 12, hook yokes 68 can be used for suspending and adjustably tilting parts boxes to slide parts from the boxes to a work table, conveyor, hopper, or machine 70. The parts box 72 is brought in on a fork truck and lifted to engage hooks 10b. The parts box is released by first lifting and then lowering the box with a fork truck (not shown). Parts box 72 preferably has four loop handles 74 which engage hooks 10b. Yokes 68 are here shown composed of two channels 76 spaced apart back to back with two hooks 10b facing in opposite directions, either in or out, in the same plane and mounted to swing on pins 12 connecting the channels. The rod end of cylinder 32 is attached either to a lever 80 integral on the top of the hook or below the hook swivel 12 according if the hook is to swing out or in respectively. The head ends of cylinders 32 are hinge or pin mounted between the channels. Overturned U-brackets 82 are pivotally secured to channels 76 over the hook swivel pins 12 or, as shown, on pins 84 connecting the channels. Through the top of each front U-bracket 82 is anchored a rope 86 run up to a fastening 87. To reduce swaying, ropes 86 diverge as they rise toward the ceiling anchors 87 secured to the flange of beam 90. The rear yoke is supported by short lengths of rope 92 connected from the rear U-brackets to ring 94 and a rope 96 run from the ring up to a hoist or over pulleys 98 suspended from a beam 90 and anchored to the drum of winch 100 mounted on a column. U-brackets 82 on the same side of the box are connected by lengths of rope 102 to space hooks 10b in proper relation to handles 74 lengthwise box 72. A rope clip 104 on rope 96 engages a pulley support when the box is level for convenience and added safety. The box is engaged and disengaged when the hook yokes are aligned horizontally and tilted by winding up the rear rope to the desired height. Both yokes could be mounted to let down to pick up the box from the floor if desired.

FIGURES 12 and 13 show how dashpot 32 is preferably connected when the hooks are faced in or out respectively. Hook 10b has lever 80 to which the rod end of dashpot 32 is connected by pin and yoke 36b screwed on the end of the rod. Hook 10c, FIGURE 13, has a lobe on the back to which the rod of dashpot 32 is clevis mounted. The head ends of the dashpots are connected between channels 76 of each yoke each by a pin or other hinge arrangement. The channels are spaced apart and the hooks spaced between them by spacing tubes welded to each channel, by bosses on the hook at the pivot, and/or by flat washers as desired.

Other Hook Closing Controls

The return of the hook after opening can be timed by any other suitable timer. The mechanical clock-like delay shown in FIGURE 14 has a pendulum 116 pivoted at 118 to hook support 68d. Hook 10d has an arm 122 radiating horizontally from its pivot 12. A cam rack 124 pivotally secured to arm 122 extends up with lobes 125 spaced alternately on opposite sides to pass between pins 126 on pendulum 116 to actuate the pendulum and extends above the lobes through guide hole 128 in the support. The lifting of the hook sets the pendulum in forced rapid motion. The pendulum takes substantially its natural period of swing to lower the hook.

The hook can be electrically controlled by the arrangement shown in FIGURE 15 where a third cam 130 on hook 10e operates cam limit switch 132 when the hook is swung past engaging positions indicating that the hook should open. Solenoid 134 is then actuated by switch 132 to open the hook fully for a time limited by timer 136 which thereafter breaks the circuit. The hook then swings free under gravity or by spring to latching position.

FIGURE 15 also illustrates how the hook can be resiliently restored to vertical latching position by springs 137 and 138 supported on 68e and bearing on opposite ends of the hook.

Figure 16:
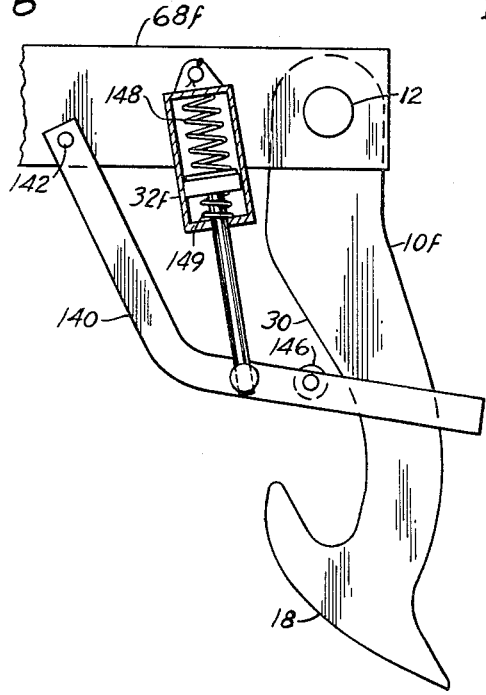
FIGURE 16 is a side view of a hook with dashpot controlled lever to hold open the hook.
Figure 17:
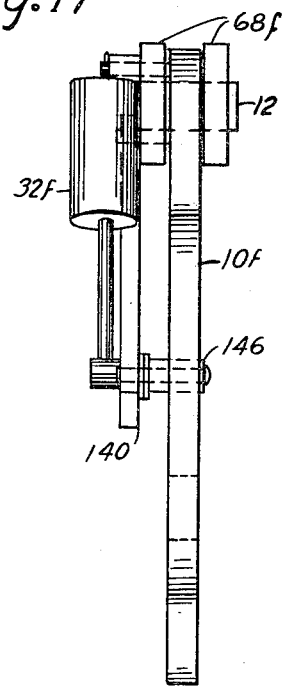
FIGURE 17 is a rear view of the hook of FIGURE 16.

Hook 10f, FIGURES 16 and 17, is the same as hook 10b except the dashpot is not secured thereto and lever 80 is omitted. Hook 10f can latch and move without moving dashpot 32f; this means less friction and so faster latching for a given hook and mount. A lever 140 pivoted at 142 to support 68f in front of the hook extends along side and beyond the rear of the hook. The rod of cylinder 32f is pivotally secured to lever 140. Roller 146 on lever 140 engages cam 30 when lever 140 is lifted by engaging with the load to swing the hook open. Dashpot 32f delays closing of hook 10f when lever 140 is lifted and is the same as 32 except: hole 56 is omitted; spring 148 (optional) helps return the piston; and spring 149 yields if the hook swings forward under load against roller 146.

Figure 18:
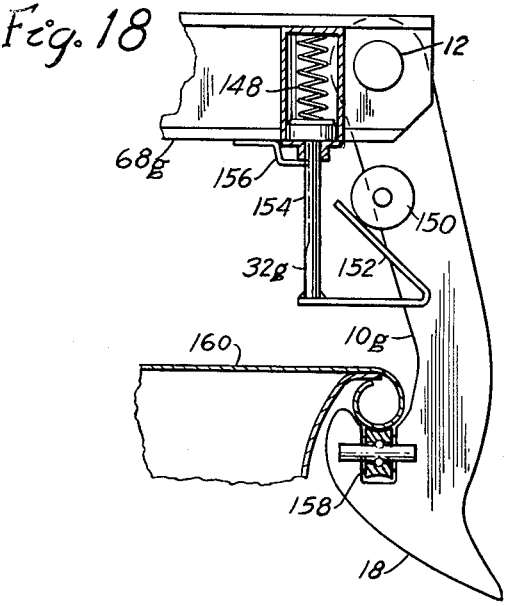
FIGURE 18 is a side view of a hook with a dashpot directly actuated by the load.
Figure 19:
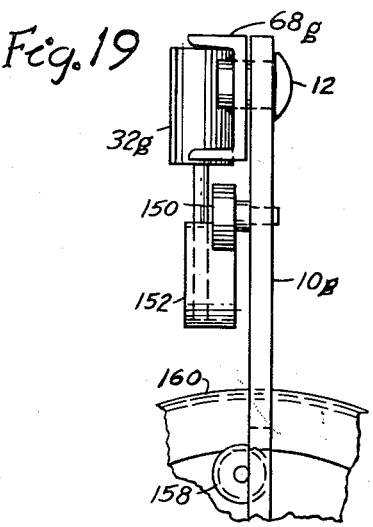
FIGURE 19 is a rear view of the hook of FIGURE 18.
Figure 24:
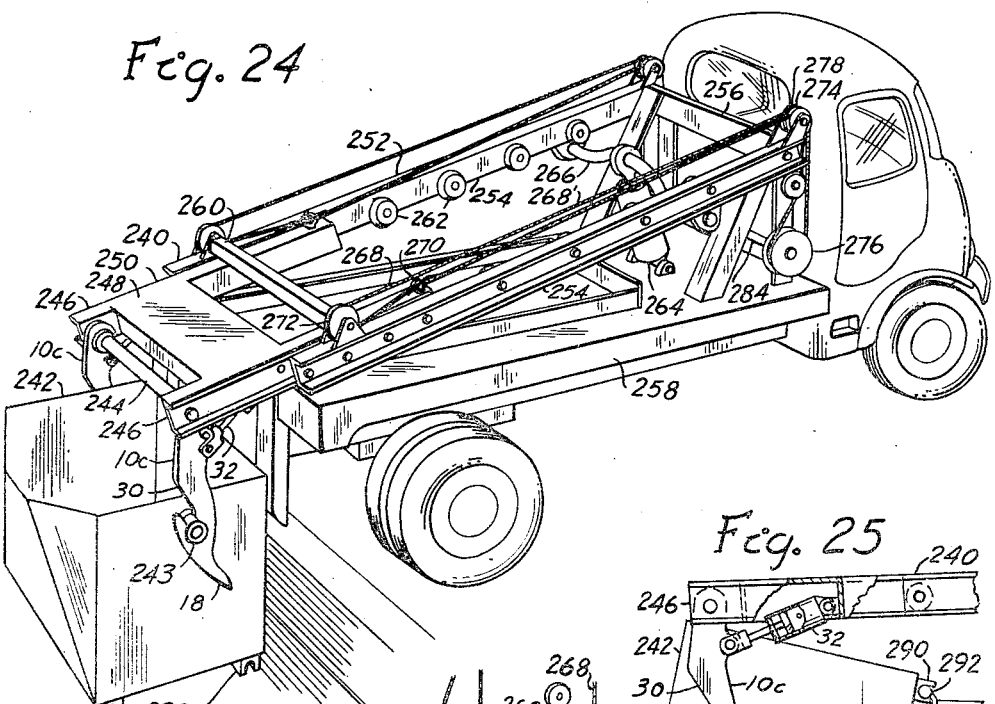
FIGURE 24 is a perspective view of a truck mounted container loader about to pick up a container below the truck.

Hook 10g, FIGURES 18 and 19, also can latch and move without moving the dashpot. Hook 10g has a roller 150 against which spring cam 152, secured to the end of the rod of dashpot 32g, engages when lifted by the load to swing the hook open. Dashpot 32g is the same as 32f except: its rod is prevented from turning by groove 154 and key 156 therein; spring 149 is omitter; and the cylinder is secured substantially rigid to support 68g.

The hooks can have a roller 158 at the saddle, as shown for hook 10g, FIGURES 18 and 19, for easily rolling around on their axis a rim of a round object such as a plating drum or steel barrel 160.

Some of the many other applications of the hook will now be described.

Dip Tank Derrick

Derrick 170, FIGURES 20–23, for dipping parts in one or more tanks 172 has a hook yoke 68h for automatically engaging and disengaging baskets 174. The hook yoke is composed of two channels 176 between which hooks 10h are pivotally mounted, a flat 178 extending up from the back of each channel 176 at the center of the yoke, and a rod 180 bracing the ends of each channel to the top of the flat according to the length of the channels. A compound boom 182 comprising two parallel rectangular tubes 184 and 185 is pivotally secured to the mast 186 of the derrick at one end and between the flats of the yoke at the other end to form a parallelogram linkage to insure that the yoke is maintained horizontal during operation. The base 187 of the derrick comprises a vertical pipe 188 braced to base plate 189. Mast 186 comprises a pipe 190 which turns in pipe 188 on thrust bearing 192 and extends about a foot above pipe 188, a smaller pipe 194 welded in pipe 190 and extending thereabove a few more feet, and two channels 196 run from pipe 190 up to support boom 182 and secured backs aligned against pipe 194.

Hooks 10h are shown as cast or forged with the tail of the lower cam run to a point 198 as viewed from the end, FIGURE 22, but are otherwise identical with hooks 10b. Hooks 10h engage to support basket 174 under loop handles or through holes 25 in upright flats 24h. Strips 200 secured on the end face of handles 24h, one on each side of hole 25, extend above flat 24h and guide the hooks and yoke into exact alignment. The hooks, hook yokes, and hook closing delays can be as described in any of the preceding hook arrangements.

Basket 174 is spotted by any suitable means such as a fork truck and locator stand 202 on the floor or by stops on a conveyor which provides a load station at an elevation above the bottoms of tanks 172. Cylinder 204, clevis mounted between mast 186 and boom 182, lowers the hooks to engage and then lifts the basket above tanks 172. The mast is then driven by motor 206, driving worm 208, engaged with worm gear 210 concentrically secured on pipe 190. The mast is turned until a pin 212 (FIGURE 23) through a hole 213 in the worm gear engages limit switch 214, mounted on the base 187, shutting off the motor. Cylinder 204 is exhausted to lower the basket into a tank 172 for degreasing or any other process. The cylinder is pressured preferably under control of a timer 216 to lift the basket above the tank. Motor 206 can carry the basket around to one or more rinse tanks where dipping can be repeated and to the unload station on the other side of the tanks where the basket is deposited at a higher floor elevation 217 than the pickup station, as shown. The tanks would be arranged in a partial circle about the mast. Pins 212 can be placed in any of several holes 213 in worm gear 210 to stop the derrick selectively over the tanks in which the basket is to be dipped. The derrick can be revolved around and around without need for reversal.

The hydraulic tank 218, pump 220, relief valve 222, and a spring-return solenoid pressure-exhaust valve 224 for actuating and controlling cylinder 204 are mounted on mast 186 to enable the derrick to revolve. The head end of cylinder 204 is connected by flexible hose to valve 224. These hydraulic components are connected in a usual way as shown in FIGURE 20.

Motor 206 is connected across power source 226 by a circuit including in series line 228, front contacts of limit switch 214, motor 206, and ground return. The front contacts of switch 214 are opened by a pin 212, preferably screwed in a hole 213, to stop the rotation of the mast. Electric timer 216 is then energized through back contacts of switch 214. Valve 224 is energized to exhaust cylinder 204 by a circuit including from line 228, back contacts of limit switch 214 and of timer 216, brush 230, slip ring 232, solenoid of valve 224, in series to ground. After a time interval in which the boom is lowered to the end of travel of cylinder 204, the back contacts of timer 216 open the circuit of solenoid valve 224, which thereupon connects pressure to cylinder 204. After the basket is lifted to a safe height, timer 216 makes front contacts, completing a circuit from line 228 through front contacts of timer 216, motor 206, to ground, which turns gear 210, which moves the pin 212 off the limit switch, which closes its front contacts, connecting the motor and deenergizing the timer, which resets.

Derrick 170 could have several booms 182 all supported on a mast and operated simultaneously from the same control for continuous processing of the basket loads.

*Container Transfer Derrick for Truck Mounting*

A truck mounted derrick 240, FIGURES 24–27, can be provided to engage and disengage containers 242 automatically and lift on or set off one or more of them on the truck with my hook 10c.

Container 242 is preferably of the now common type having two trunnions 243 on opposite ends near the top. Hooks 10c latch over the trunnions when let down thereon. The lower cams of the hooks are preferably bent out at the bottom to engage better. The hooks are mounted to swing on shaft 244 secured between parallel out-turned channels 246 spaced apart and secured by a channel section 248 to form a carrier 250. Shaft 244 can be spring positioned to be self centering and carries hooks 10c with it. Dashpot 32 delays the closing of both hooks if they are secured to turn with shaft 244, but it is preferred to have the hooks turn on the shaft to latch independently of each other, and accordingly each hook has a dashpot 32 or its equal.

Carrier 250 is supported on a boom 252, which comprises two parallel channels 254 spaced to straddle container 242 and pivotally secured on the same axis facing out, one on each side and near the top of an A frame 256, which is secured on the truck bed 258 near the front. Bar 260 at the rear above channels 254 spaces them. Wheels or rollers 262 are spaced and secured along the facing faces of channels 254 to run in channels 246 and support the carrier. A cylinder 264 is clevis mounted in a yoke 266 connecting channels 254 on the under side thereof near A frame 256. Yoke 266 is bent up in the center to permit use of a longer cylinder 264 without cutting away the truck bed to increase the lift of the derrick. Yoke 266 is therefore pivotally secured below each channel 254.

A cable 268 is anchored to the forward end of carrier 250 at 270 and is run back around a pulley 272 on the extended end of the channel 254 on the same side of the truck. The cable runs from there over a pulley 274 on the pivot end of the boom and down around a drum 276. Another cable 268' or a continuation of the first is run forward from the anchor 270 over a pulley 278 on the same pin as pulley 274 and down around drum 276 in the opposite direction so that the drum reels on and off opposite ends of the cable as it turns and runs the carrier in or out on the boom according to the direction of rotation of drum 276. Drum 276 can be turned and held by a hand winch or preferably by motor 280 through worm reducer 282 whose worm gear is secured on shaft 284 for turning drum 276. Motor 280 is preferably operated from the truck battery 286 by connection across the battery through reverse switch 288, shown in FIGURE 24. A similar cable arrangement is preferably provided on the opposite side of the truck and driven from the same shaft to reduce the possibility of the carrier twisting and to take part of the load.

Figure 25:
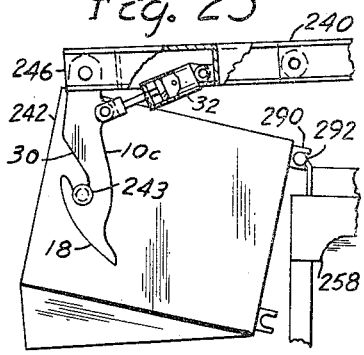
FIGURE 25 is a side elevation of the rear portion of the loader of FIGURE 24 with a portion cut away to show the interior of the dashpot and shown dumping a load.
Figure 26:
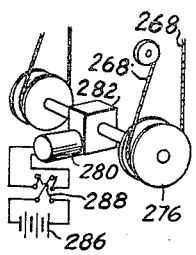
FIGURE 26 is a partial perspective and schematic view of the controls for the loader of FIGURE 24.
Figure 27:
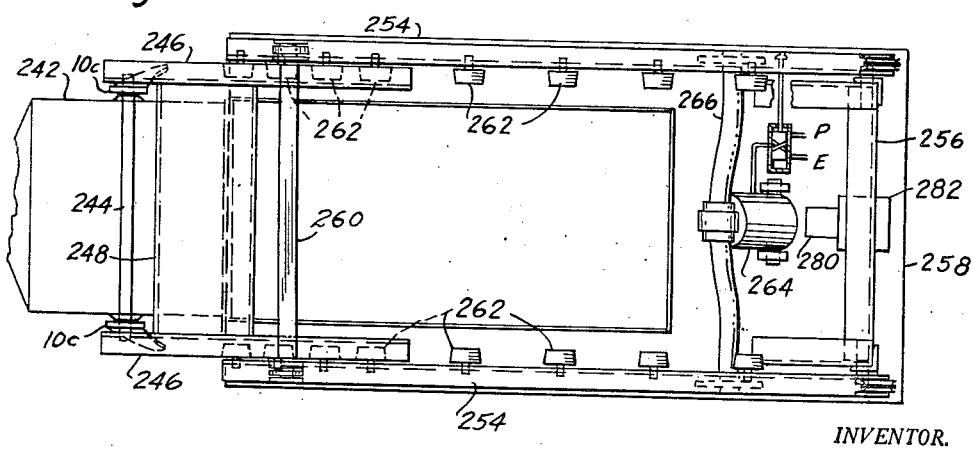
FIGURE 27 is a plan view of the loader of FIGURE 24.

Container 242 has runners 290 secured on the bottom to engage a rim 292 across the rear of the truck bed for dumping the box as shown in FIGURE 25.

*Suspended Container Transfer*

A variation of the carrier described in my patent application Ser. No. 714,453, titled Transportation System is shown in FIGURES 28–31. The carrier 300 for transfer of container 302 has a frame 304 for spacing and supporting any suitable number of hooks 10c thereabout for engaging container 302 shown being transferred from the platform 306 of a railway car, truck, trailer, station, or conveying device. The platform has locators, tabs 308, for securing the container horizontally. Hooks 10c latch under a hook rail 310 around the top of the container. The frame can be guided into position and kept from swinging by two sets of telescoping guides 312, as in FIGURE 29. Guides 314 secured to frame 304 keep the container from slipping on the hooks and help in aligning the frame for hooking, but are optional. A usual hoisting arrangement 315 lifts and lowers frame 304 to and from the carrier. The carrier can be supported at each end on trolleys or trucks 316 or by any suitable means for parallel or transverse horizontal movement. Adjacent hooks 10c can be connected by a runner 318, FIGURE 30, which distributes the load along the molding 310.

Suspended Box or Rack Carrier

Referring to FIGURES 32–35, carrier 330 for rack 332 or parts box 333 is loaded and unloaded with a lift such as fork truck 334 or a section of the monorail 336 can lift and lower the carrier. A train of these carriers can be loaded along a loading dock with the fork truck, the train (pulled by monorail tractor T) dispatched to a warehouse, the train of carriers bunched as shown in FIGURE 35 and unloaded and reloaded with a portable stacker 338.

Four hooks 10j are pivotally mounted each on the end of one of two yokes 68j connected by sill 340 to engage hooks 342 secured on the container 332 or 333. Each yoke 68j comprises two angles turned legs in and down and notched and bent down a few inches each side of the center and a tie beam 344 of square tubing with U-shaped ends 346 extending between the depending legs of the angles between which hooks 10j are pivotally mounted to swing in the plane of the yoke. A cam or roller 350 on the face of hook 10j above tooth 20j engages the sloping top of hook 342 to open the upper hooks when the container 332 or 333 is lifted above engaging position.

Hook yokes 68j are pivotally supported on angle brackets 352 above sill 340. Sill 340 is preferably an I-beam suspended on two swivel trolleys 354 each having the rod 356 connecting their side plates run through the eye of a threaded rod end 358, FIGURE 34. A box formed by two facing channels 360 secured by a plate 362 under their upper legs has a hole 364 in the plate through which the threaded rod end depends. A two-piece spherical washer 366 supports the plate on nut 368 on the rod end. The upper piece of the spherical washer is secured from slipping on plate 362. The bottom legs of channels 360 extend under the upper flanges of the I-beam to support the sill and are secured thereto.

The preferred coupling comprises a bar 370 universally mounted to the bottom and end of a sill and extending under the adjacent sill and a trolley 372 on that sill, the trolley being swivel mounted to the end of the bar to turn with the carrier around corners and to roll along the sill to bunch the carriers. A latch 374 holds the trolley 372 at the end of the sill. A cable 376 is run along the carrier train through loops 378 on the latches and is secured to an end carrier. When cable 376 is pulled taut it lifts the latches of the couplers and bunches the carriers. The cable is reeled on drum 380 at the opposite end of the train from which it is anchored. Drum 380 is turned by a hand chain or loop of rope 376 drooped from the drum to a reaching height. Rope 376 unreels when the carrier train is started up, and the couplers run to the ends of the sills and latch.

Suspended Pallet Carrier

The hook yokes can extend down to enable placement of hooks 342 on the ends of a pallet, but the cost of the pallet relative to the cost of the hooks makes it desirable to provide a pallet carrier which does not require hooks to be mounted on the pallet.

A preferred carrier for hookless pallets is shown in FIGURES 36–40, with the same trolleys, sill, and couplings as described for the carrier FIGURES 32–35. Hook yokes 68p are A frames which extend down beyond each end of the pallet 384 and pivotally secure a hook, latch, or load-bearing assembly 10p. Each yoke 68p is formed from an equal length of channel 388 turned legs down and notched a few inches each side of the center and bent down to cross member 344p and notched and bent down vertically from the cross member. Brace 344p is preferably square tubing welded between the legs of the channel.

The latch hook assembly 10p has two load bearing end plates 390 and one or more lever plates 392 secured on shaft 394 and connected by a formed plate 396 which engages substantially the full length of the pallet when raised up thereunder on fork truck 334. This plate is engaged when in the uptilted position shown in solid lines in FIGURE 39 and tilted up to the position shown in phantom lines. When the pallet reaches a higher elevation the hook drops back under the pallet to the original position by gravity. The pallet is then set down on the tops of plates 396. A slope 398 guides the pallet to center lengthwise the carrier on plates 396. The latch is then horizontal, the position shown in FIGURES 36, 37, and in phantom lines in FIGURE 40, in which position the bottom back edge of plates 390 rest against the outer leg of channels 388, the inner legs of channels 388 being removed from brace 344p down, as seen in FIGURE 36. The pallet is held from sliding off the side of the carrier by guide brackets 400 secured to the channels as shown.

Lever plates 392 operate a fluid hookup to store energy from the setting down of the container to open the hooks when the pallet is picked up. A compressor, cylinder 410, is pivotally secured head end to a bar 344p. Its rod 412 is slideably mounted on the stem of yoke 414 which is pivotally pinned to one of two lever plates 392 on the support. The rod has a flange 416 secured thereon which engages the end of yoke 414 in the normal engaging position of the hook. The piston 417 is held extended to the rod end of the cylinder by compression spring 418 to hold the hook in the engaging position. The rod end of the cylinder exhausts through hole 420, FIGURE 39, to atmosphere.

When the pallet is set down on latch hooks 10p after they have latched thereunder, lever 392 forces piston 417 against spring 418 pressing the fluid through check valve 422 connecting the head end of cylinder 410 to accumulator 424, which stores this energy. When the pallet is lifted above latching position, accumulator 424 connected to the head end of cylinders 426, each pivotally connected on opposite ends of the carrier between brace 344p and a lever 392 below, forces the hooks fully open to the position shown in FIGURE 40. The movement of the pistons of cylinders 426 uncovers passage 428 to exhaust the cylinder through bleed valve or orifice 430 which times the closing of the hook to latching position. An orifice 430 can be supplied for each cylinder 426 or both ports 248 can be connected to one orifice as shown. Where one orifice is used it preferably exhausts to the head end of compressor 410, as shown. Where an orifice for each cylinder 426 is provided each orifice preferably exhausts to atmosphere and leakage past the piston of the compressor can return its piston to the rod end under force of spring 418, thus eliminating the connection from port 428 to the compressor. The compressor 410, accumulator 424, and a cylinder 426 are mounted on plate 432 by U-bolts and secured to the carrier by the head end pivots of compressor 410 and of cylinder 426, which are on the same axis. Only one compressor 410, check valve 422, accumulator 424, and bypass restriction 430 are needed, since the accumulator and compressor can store energy for opening both hooks. A flexible hose run up along the sill connects points x to x and y to y, FIGURES 36 and 38. A pressure supply comprising 410, 422, and 424 can be supplied for each latch hook if desired to store more energy. The circuit is schematically represented in FIGURE 41 with the components given the same numbers, but the cylinders are shown below instead of above the hook.

Having thus described a few of the many possible variations and applications of this invention it should be understood that all matter contained in the above description or shown in the accompanying drawings shall be interpreted as illustrative and not in a limiting sense, further I contemplate to cover by the appended claims all variations and parts which fall within the true spirit and scope of this invention.

I claim as my invention:

1. A device for holding an object comprising in combination, pieces for supporting the object, said pieces being pivotally secured together to support the object from opposite sides, a first cam means on the bottom of each piece for opening the pieces when said pieces are let down on the object, second cam means located above said first cam means for further opening the pieces under the weight of the device, said pieces being arranged to close by gravity, and time delay means for delaying the closing of the pieces until they can be lifted off the object.

2. Two engaging means pivotally secured together for engaging an object from opposite sides, a dashpot including a piston pivotally secured between portions of said engaging means, said piston being extended when the engaging means closes the piston of said dashpot comprising a cupped flexible washer for drawing a vacuum on the return stroke to delay the closing of the engaging means to enable release of said object, said engaging means being biased to close rapidly, and a passage in the cylinder of said dashpot uncovered by said washer to break the vacuum to permit rapid engagement of said engaging means after the delay.

3. A device for holding an object comprising in combination a plurality of holding members for supporting the object, means pivotally securing said holding members to swing toward and from each other to support the object therebetween first means on the bottom of each holding member for opening the holding members to engage the object when the holding members are let down, second means for further opening the holding members to release the object, the release of the object being actuated by the movement of the object relative to the holding members when the weight of the object is removed from the holding members and the object is sufficiently elevated above the engaging position, and delay means for returning the holding members to engaging position after a time to allow the holding members to be lifted from the object.

4. An automatic hooking device comprising opposed hooks each including a hole in its top, having a pin means through said holes for supporting said hooks to swing thereon, said hooks having an upstanding tooth and a saddle, the saddle of which is spaced below said hole, a lower cam extending down and back from the tooth to initially open the hook, an upper cam above the tooth to further open the hook, a dashpot including a piston rod pivotally connected between said hooks for delaying the closing of the hooks when opened wide to release, said dashpot having vent holes to permit rapid engagement of the hooks.

5. In a hooking device as claimed in claim 4, said piston rod being extended when the hooks are closed and compressed when the hooks are opened.

6. A vertical holding device comprising in combination, at least one engaging means pivotally mounted on a support to swing open, said engaging means having cam means for swinging said engaging means into position under a load to close on to and hold the load, means actuated by lowering said engaging means on said load for swinging said engaging means wide open, delay means for holding said engaging means open when opened wide, said delay means having timing means for controlling the delay of the closing of said engaging means during which time the load and engaging means can be separated vertically.

7. A device as in claim 6, said delay means being a dashpot having port and checkvalve means for delaying only the initial closing movement.

8. In combination, a load engaging and supporting member, support means pivotally supporting said member to swing in a vertical plane to engage and disengage a load, first cam means on said member for moving said member under the load, second cam means for swinging said member away from under said load, said second cam means being actuated by the further lowering of the member on said load, and time-delay means connected between said member and said support means for delaying the return of said member to load engaging position.

9. In a combination as in claim 8, said member being a hook.

10. Tongs which comprise in combination a plurality of opposing clamping members pivotally secured together for engaging opposite sides of a load, lower cam means on said members for spreading said members to permit lowering said members down the load to a position for gripping the load, linkage means for suspending the opposite ends of said tongs to a central point above said tongs to clamp them closed under the weight of the members and to open said members when rested on the load, and a dashpot pivotally secured between said linkage means and said members for delaying the closing of the members so that they can be lifted from the load after opening.

References Cited in the file of this patent

UNITED STATES PATENTS

| | | |
|---|---|---|
| 287,831 | Hitchcock | Nov. 6, 1883 |
| 514,788 | Symonds | Feb. 13, 1894 |
| 582,080 | McKinnon | May 4, 1897 |
| 1,150,581 | Lan | Aug. 17, 1915 |
| 1,165,900 | Rahm | Dec. 28, 1915 |
| 1,775,220 | Aeschbach | Sept. 9, 1930 |
| 2,338,188 | Lewis et al. | Jan. 4, 1944 |
| 2,365,727 | Pike | Dec. 26, 1944 |
| 2,386,216 | Hay | Oct. 9, 1945 |
| 2,425,421 | Deily | Aug. 12, 1947 |
| 2,547,502 | Smith et al. | Apr. 3, 1951 |
| 2,606,675 | Jones | Aug. 12, 1952 |
| 2,621,069 | De Anguera | Dec. 9, 1952 |
| 2,665,937 | Reigh | Jan. 12, 1954 |
| 2,847,245 | Leslie | Aug. 12, 1958 |
| 2,904,370 | Meinholtz et al. | Sept. 15, 1959 |
| 2,958,557 | Cianchette | Nov. 1, 1960 |